Nov. 3, 1959    O. HERRMANN ET AL    2,911,321
POLYTEREPHTHALIC ACID ESTER LAMINATED FOILS
Filed Feb. 14, 1956
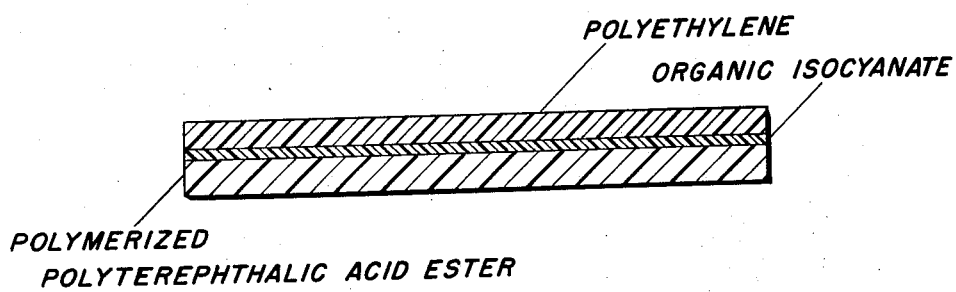
OTTO HERRMANN
HERMANN MULLER
          INVENTORS
BY *Connolly and Hutz*
ATTORNEYS

United States Patent Office 2,911,321
Patented Nov. 3, 1959

2,911,321

POLYTEREPHTHALIC ACID ESTER LAMINATED FOILS

Otto Herrmann, Wiesbaden, and Hermann Müller, Wiesbaden-Biebrich, Germany, assignors to Kalle & Co. Aktiengesellschaft, Wiesbaden-Biebrich, Germany Application February 14, 1956, Serial No. 572,174

Claims priority, application Germany February 19, 1955

12 Claims. (Cl. 117—76)

The present invention relates to plastic foils. More particularly, it is concerned with foils made of highly polymerized polyterephthalic acid esters which, on account of their properties are not well suited for sealing and laminating.

Of late, highly polymerized substances which are obtained by polycondensation of the esters of terephthalic acid with bivalent alcohols, mainly from the ethylene glycol esters of terephthalic acid, have gained considerable technical interest, e.g. in the production of foils. Usually, they are called "high polymeric polyalkylene terephthalates," or, in the event that ethylene glycol is used as the esterification component in their production, as "high polymeric polyethylene terephthalates."

From the said substances, foils are obtained in known manner by extruding the melted polycondensate through a slot and cooling it, e.g. on a smooth surface. The properties of the foil thus obtained from the melted mass may be considerably improved by stretching the foil both lengthwise and transversely, preferably up to as much as 2 to 3½ times its original dimensions, and heating it to higher temperatures, e.g. 140-230° C., while maintaining this increased size. This heating process is generally called the "fixing" of the foil. The foils thus improved have a great strength and are very fast to organic solvents. Apparently, these properties make these foils extremely suited for many uses. However, their unusual fastness to organic solvents causes difficulties when the foils are to be combined with each other or with other supports, such as, e.g. other foils. Another disadvantage is that it is practically impossible to hot-seal foils of this kind.

It is well known to provide foils of regenerated cellulose with a thermoplastic coating in order to prepare them for hot-sealing or to combine them with other foils. In the case of improved highly polymerized polyalkylene terephthalate foils, the production of a firmly adhering coating meets with considerable difficulty.

The primary object of the present invention, therefore, is the refinement of highly polymerized polyalkylene terephthalate foils, in the first line polycondensates of terephthalic acid glycol esters, which have passed a stretching and heating operation in order to make them capable of being hot-sealed or to render them receptive to adhesives.

Another object of the invention is to make such foils capable of being combined with layers or films of other plastics.

A method has now been found by which the improved highly polymerized polyalkylene terephthalate foils can be provided with a firmly adhering polyethylene layer. Following the method according to the invention, the polyethylene is coated onto the improved foil of highly polymerized polyalkylene terephthalate in the presence of anchoring agents, which, at a temperature range of between 100 and 230° C., produce a strong adherence of the polyethylene layer formed to the surface of the improved polycondensate foil.

Anchoring agents according to the present invention are organic isocyanates of a reduced volatility which resist temperatures between 100 and 230° C. and can be caused to react at said temperatures. In the present application, the expression "isocyanates" is intended to include mono-, di-, and poly-isocyanates, as well as the monomeric, dimeric and polymeric isocyanates. Moreover, it includes also the so-called "disguised" isocyanates, i.e. addition compounds of the isocyanates being split up into their components on heating, such as, e.g., the compounds prepared by reaction of isocyanates with short-chained tertiary aliphatic alcohols, ethylene imine or acetamide. At temperatures between 100 and 230° C., these compounds have a more or less strong tendency to re-form isocyanate, and are remarkable for their low volatility. In addition thereto tri-N,N-ethylene-iminophosphinous oxide and p-nitroaniline are also anchoring agents in the sense of the present invention.

Usually, the anchoring agents to be used according to the present invention are operative only and show their anchoring capacity only when they are heated. This anchoring effect is attained the more effectively and quickly the higher the temperature to which the improved polycondensate foil is heated while or after coating it with the polyethylene layer. Experience has shown that it is not advisable to exceed the temperature used for the fixation of the foil after it had been stretched. If, for example, the anchoring operation, as well as the anchoring effect, are intended to be intensified by applying a temperature of 210° C., a foil must be used which, after stretching, had been fixed at a temperature not lower than 210° C. As it is generally advantageous to apply the polyethylene coating quickly, i.e., at temperatures as high as possible, it is advisable to apply highest possible temperatures when fixing the polycondensate foil.

By the method according to the present invention, only small quantities of the anchoring agent must be present when applying the polyethylene layer. This may, for instance, be attained by applying a low percent solution of the anchoring agent, e.g. isocyanate, as a thin layer to one or both sides of the polycondensate foil, removing the solvent by heating, and finally, applying the polyethylene layer to one or both sides of the foil. If tri-N,N-ethylene-imino phosphinous oxide is used as an anchoring agent, it may be advantageous, e.g. to heat the foil with the solution of the anchoring agent applied thereto, before applying the polyethylene layer, for a short time, to a temperature ranging between 100 and 230° C., but not exceeding the temperature used for fixing the foil. In the case of isocyanates and "disguised" isocyanates, this pre-heating is not advisable in most cases. Immediate addition of the anchoring agent to the solution or melt of the polyethylene is also possible, provided the solubility of the anchoring agent in said solution or melt is satisfactory. This method requires also but small quantities of the anchoring agent.

There are several different ways of applying the polyethylene layer to the polycondensate foil, which latter may be pre-coated with the anchoring agent if desired. By one method, melted polyethylene is extruded through a slot-nozzle and coated hot onto the polycondensate foil as a thin layer. The temperature at which the coating operation takes place may be as high as the temperature used for fixing the polycondensate foil. Even if the melted polyethylene is applied to the foil at the highest possible temperature, the heating effect very often is not sufficient to bring about a good adhesion because generally only thin polyethylene layers are applied which cool down very quickly. Therefore, it is always advantageous to subject the compound foil to an after-heating process at temperatures between 100 and 230° C. in order to obtain the best possible adhesion.

By another method the polyethylene layer is formed by coating the polycondensate foil with a polyethylene solution, e.g. an 85 to 110° C. warm solution of polyethylene in trichloroethylene, chlorobenzene, xylene, and the like. If only one side of the polycondensate foil is to be coated, the polyethylene solution may be applied by means of a casting box, whereupon the solvent is removed by drying in the heat and, generally, the foil is after-heated at temperatures between 100 and 230° C. By means of known varnishing devices, the warm polyethylene solution may be applied to both sides of the polycondensate foil to be coated and the compound foil subsequently treated as stated before.

The polyethylene layer may be applied by either of the methods just described, whether the anchoring agent was previously coated as a very thin layer onto the polycondensate foil or is being applied dissolved in the polyethylene melt or polyethylene solution. However, if the polycondensate foil is to be coated with extremely thin polyethylene layers of, e.g., 3 to 30μ thickness, application of the polyethylene by the so-called varnishing method is preferable. In this case, a further simplification of the process may be attained by dissolving the anchoring agent in the polyethylene solution and applying both substances in a one-step operation. Many of the anchoring agents are sufficiently soluble in the warm polyethylene solution and do not lose their effectiveness even if the warm solution stands for some time.

By another method, the polyethylene layer may be applied to the polycondensate foil by placing a finished polyethylene foil tightly onto the polycondensate foil after said polycondensate foil had been coated with a thin layer of the anchoring agent. This loose compound is then heated to 140–230° C. so that the polyethylene foil is sealed to the polycondensate foil lying beneath. Thus an improved polycondensate foil with a tightly adhering polyethylene coating is obtained.

It is surprising that by practicing the method of the present invention the high-quality, improved foils of highly polymerized polyterephthalic acid esters become more easily workable. Polyethylene is likewise relatively insoluble, can be combined with only a very few substances, and, moreover, is chemically inert. Nobody acquainted with the properties and the behaviour of the polyterephthalic acid esters as well as a polyethylene could expect that the establishment of a tightly adhering polyethylene coating on the improved polyterephthalic acid ester foils, by the method of the present invention, would be successful.

The figure of the drawing represents a laminated foil embodying the present invention.

The following examples are inserted in order to illustrate the present invention, the parts being by weight if not otherwise stated. No restriction of the invention to the subject matter disclosed in the examples is intended.

*Example 1*

The foil to be coated comprises an improved polyterephthalic acid ethylene glycol ester foil of 25μ thickness, which had been prepared from a proportionally thicker foil by stretching this foil first to 3 times its original width and then to 2.7 times its original length, and subsequently heating in this state, for 2 minutes, to 205° C. while preventing it from shrinking. One side of the foil thus improved is thinly pre-coated with an about 2% methylene-chloride solution of a compound obtained by reaction of tertiary butyl alcohol with toluylene-diisocyanate. By a slight increase of temperature, the methylenechloride is evaporated. Thus a very thin, not sticky pre-coat is formed.

Onto the improved polycondensate foil thus provided with a pre-coat, melted polyethylene is extruded as a layer of about 40μ thickness. For extrusion, an extruder with a slot-nozzle is used in known manner. The extruded polyethylene layer flows onto the improved polycondensate foil shortly before this foil enters a slit left between a rubber roller on the one side and a roller of polished metal which is heated to 80° C. on the other side. Upon entering the slit, the metal roller presses the polyethylene layer against the polycondensate foil. The compound foil thus obtained is subsequently heated for 3 minutes to 170–180° C. by passing it through a heating channel, or by passing it over a heating roller. Care must be taken that the polyethylene layer which is in a melted state at this temperature lies open.

Thus a compound foil of about 65μ thickness is obtained, one side of which can be hot-sealed, forming seams which are extremely strong. The permeability of this compound foil to the humidity of the air is very low. Its permeability for gases and aromas is also extremely low and can practically be neglected. The foil is therefore very suited for packaging purposes.

The reaction product of teritary butyl alcohol with toluylene diisocyanate is prepared as follows:

40 g. of tertiary butyl alcohol are mixed with 45 g. of toluylene diisocyanate at about 100° C. The mixture is kept at this temperature for 3 hours, whereupon an additional 45 g. of toluylene diisocyanate are added. After keeping the reaction mixture at 100° C. for 4 hours more, it is cooled down. The precipitating crystalline mass is washed with gasoline and dissolved in methylene chloride.

*Example 2*

An improved polyterephthalic acid ethylene glycol ester foil of 25μ thickness, such as the one described in Example 1, is thinly coated with a 2% solution of toluylene diisocyanate in methylene chloride at a temperature of 30° C. The foil is conveyed through a heating means at a temperature of 60° C., for a short distance, thus causing the solvent to evaporate, and then it is put onto an endless metal band which carries it through a drying channel. Before the foil enters the channel, a 15% solution of polyethylene in a mixture of chloro-benzene and trichloro-ethylene (1:3), which has a temperature of 80° C., is poured onto the foil by means of a casting box. The casting box is adjusted in such a way that a uniform polyethylene layer of 25μ thickness forms upon drying. The improved polyterephthalic acid ethylene glycol ester foil thus coated is dried in a drying channel at a temperature of 110° C. Towards the end of the drying process the temperature is raised to 170° C.

A laminated foil is obtained which has the same qualities as the foil described in Example 1. It is, however, slightly more permeable to air humidity.

*Example 3*

The same materials and the same process are used as in Example 2, except that instead of the solution of toluylene diisocyanate in methylene chloride, there is substituted a 2% solution of a urea compound prepared by reacting 1 mol of phenyl isocyanate with 1 mol of ethylene imine.

The resultant laminated foil is similar in its characteristics and qualities to the foil of Example 2.

*Example 4*

The same materials and process are used as in Example 2, except that instead of a 15% polyethylene solution, there is used a solution comprising 12% polyethylene and 3% polyisobutylene.

The resultant laminated foil has a sealable surface which can be combined by means of heat and pressure, even more easily with paper and similar sheets than the foil of Example 2.

*Example 5*

An improved polyterephthalic acid ethylene glycol ester foil, which has a thickness of 12μ but has been improved in the same way as described in Example 1, is passed through a 80° C. warm solution which was prepared by dissolving 6 parts by weight of polyethylene and 0.12 part by weight of the compound corresponding to formula

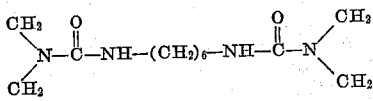

in 94 parts of chlorobenzene. The foil leaves this solution in a vertical direction and at a low speed, which causes thin, uniform layers of polyethylene to settle on both sides of the foil. The coated foil is dried for 2–3 minutes at a temperature of 160° C. Subsequently, it shows, on both sides, a polyethylene coating of about 5μ thickness, adhering so tightly to the foil that the improved polycondensate foil forms strong joints upon hot-sealing. Both sides of the polycondensate foil may be hot-sealed. The foil is therefore very suitable for manufacture into all kinds of containers and will find increased interest as an electrical insulation material.

*Example 6*

One side of a polyterephthalic acid ethylene glycol ester foil of 25μ thickness, which has been improved as described in Example 1, is coated with a 80° C. solution prepared by dissolving in 96 parts by weight of chlorobenzene 4 parts by weight of low-pressure polyethylene and 0.15 part by weight of a polyisocyanate prepared by reaction of 2,4-toluylenediisocyanate and hexane triol, e.g. the product marketed under the trademark "Desmodur TH." The foil thus coated is dried for 2–3 min. at 160° C. After drying, the foil shows on one side a coating of low-pressure polyethylene which has a thickness of about 5μ and adheres very tightly to the foil. Onto the polyterephthalic acid ethylene glycol ester foil thus precoated with a polyethylene layer a melted layer of low-pressure polyethylene of about 80μ thickness is extruded, using the apparatus described in Example 1.

What is claimed is:

1. Process of making practically impermeable heat-sealable highly polymerized polyterephthalic acid ester foils which have been improved by stretching them lengthwise and transversely to at least two times their original dimensions and fixing them in stretched condition by applying temperatures of between 140–230° C., which comprises coating a surface of the fixed foil with a continuous layer consisting essentially of polyethylene, and with an anchoring agent selected from the group consisting of mono-, di-, and poly-isocyanates in the monomeric and polymeric state, the reaction products of isocyanates with short-chained tertiary aliphatic alcohols, the reaction products of isocyanates with ethylene-imine, the reaction products of isocyanates with acetamide, tri-N,N-ethylene-imino phosphinous oxide, and p-nitro-aniline, and heating the so-coated foil to an elevated temperature not exceeding the temperature used for fixing the foil.

2. Process according to claim 1 characterized in that the foil is heated to temperatures lying between 100 and 230° C., but not exceeding the fixing temperature of the foil.

3. The process of claim 1 wherein the anchoring agent is applied to the foil prior to the polyethylene.

4. A laminated article comprising a base foil of a highly polymerized polyterephthalic acid ester, a continuous heat sealable polyethylene coating layer, and an anchoring layer between said base and said coating layer, said anchoring layer comprising a material selected from the group consisting of mono-, di- and poly-isocyanates in the monomeric and polymeric state, the reaction products of isocyanates with short-chained tertiary aliphatic alcohols, the reaction products of isocyanates with ethylene-imine, the reaction products of isocyanates with acetamide, tri-N,N-ethylene-imino-phosphinous oxide, and p-nitroaniline.

5. A laminated article comprising a base foil of a highly polymerized polyterephthalic acid ester, a continuous heat-sealable polyethylene coating layer, and an anchoring layer between said base and said coating layer, said anchoring layer comprising the reaction product of tertiary butyl alcohol with toluylene-diisocyanate.

6. A laminated article comprising a base foil of a highly polymerized polyterephthalic acid ester, a continuous heat-sealable polyethylene coating layer, and an anchoring layer between said base and said coating layer, said anchoring layer comprising the reaction product of phenyl isocyanate and ethylene imine.

7. A laminated article comprising a base foil of a highly polymerized polyterephthalic acid ester and, firmly bonded to said base, a continuous heat-sealable layer of a mixture of about 6 parts by weight of polyethylene and 0.12 parts by weight of a compound having the formula

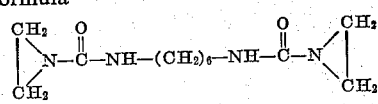

8. A laminated article comprising a base foil of a highly polymerized polyterephthalic acid ester and a continuous heat-sealable coating layer firmly bonded to said base, said coating layer comprising the reaction product of a heated solution in 96 parts by weight of chlorobenzene of 4 parts by weight of low-pressure polyethylene and 0.15 parts by weight of the reaction product of 2,4-toluylene-diisocyanate and hexane triol.

9. A laminated article comprising a base foil of a highly polymerized polyterephthalic acid ester, a continuous coating layer consisting essentially of heat-sealable polyalkylene, said coating layer being cemented to said base by an anchoring agent selected from the group consisting of mono-, di- and poly-isocyanates in the monomeric and polymeric state, the reaction products of isocyanates with short-chained tertiary aliphatic alcohols, the reaction products of isocyanates with ethylene-imine, the reaction products of isocyanates with acetamide, tri-N,N-ethylene-imino-phosphinous oxide, and p-nitro-aniline.

10. The laminated article of claim 9 wherein the anchoring agent is present in the form of a distinct anchoring layer situated between said base and said coating layer.

11. The laminated article of claim 10 wherein said anchoring agent is a relatively non-volatile organic isocyanate.

12. The laminated article of claim 9 wherein the anchoring agent is a component of said coating layer.

References Cited in the file of this patent

UNITED STATES PATENTS

| | | |
|---|---|---|
| 2,678,285 | Browning | May 11, 1954 |
| 2,698,241 | Saner | Dec. 28, 1954 |
| 2,702,406 | Reed | Feb. 22, 1955 |
| 2,826,526 | Meyrick | Mar. 11, 1958 |

FOREIGN PATENTS

| | | |
|---|---|---|
| 863,407 | Germany | Jan. 19, 1953 |
| 883,653 | Germany | July 20, 1953 |

OTHER REFERENCES

Meyrick et al.: Polyisocyanates in Bonding, Transactions Inst. of Rubber Industry, October 1949, pp. 150–166.